(12) United States Patent
Naaktgeboren et al.

(10) Patent No.: US 6,295,797 B1
(45) Date of Patent: Oct. 2, 2001

(54) MOVABLE WINDGUARD

(75) Inventors: Adrianus Naaktgeboren, Varsenare;
Dirk A. R. Vandamme, Uitkerke;
Freddy A. Hindryckx, Ostend, all of (BE)

(73) Assignee: New Holland North America, Inc., New Holland, PA (US)

( * ) Notice: Subject to any disclaimer, the term of this patent is extended or adjusted under 35 U.S.C. 154(b) by 0 days.

(21) Appl. No.: 09/501,810

(22) Filed: Feb. 10, 2000

(51) Int. Cl.$^7$ ..................................... A01D 89/00
(52) U.S. Cl. ............................... 56/364; 56/341
(58) Field of Search ............... 56/341, 364, 432, 56/DIG. 20

(56) References Cited

U.S. PATENT DOCUMENTS

| | | | |
|---|---|---|---|
| 2,458,713 | * | 1/1949 | Linderer . |
| 2,872,772 | * | 2/1959 | Nolt . |
| 4,411,127 | | 10/1983 | Diederich ........................... 56/364 |
| 4,516,389 | * | 5/1985 | Core . |

FOREIGN PATENT DOCUMENTS 0100628   2/1984   (EP) .
0152291   8/1985   (EP) .

* cited by examiner

Primary Examiner—H. Shackelford
(74) Attorney, Agent, or Firm—J. William Stader; Larry W. Miller

(57) ABSTRACT

An agricultural harvesting machine, such as a baler, is provided with a pick-up assembly and a feeder mechanism for picking up crop material from a field and feeding it to the inlet of a baling chamber. A crop retainer mechanism, such as a windguard, are mounted above the feeder mechanism for engaging the upper portion of said crop material whilst it is being fed to said inlet. The retainer mechanism is movable between a lower position assumed when no crop material is present on said crop intake apparatus and an upper position when a considerable amount of crop material is present on said crop intake apparatus. The harvesting machine is also provided with a dampening mechanism for damping the motion of said crop retainer mechanism. Advantageously, the motion is damped by a pair of gas springs mounted to the transverse rod of the windguard. This arrangement precludes sudden movements of the windguard and ensures a regular flow of the picked up material to the baling chamber.

10 Claims, 2 Drawing Sheets

MOVABLE WINDGUARD

BACKGROUND OF THE INVENTION

The present invention relates to agricultural crop harvesting machines, such as round or rectangular balers, loader wagons, combine or forage harvesters, having a pick-up mechanism for lifting crop material such as hay, straw or silage grass from a field and delivering it to a crop collecting and/or processing apparatus. More particularly the invention pertains to a movable retainer screen or windguard which is mounted above the guide surface of the pick-up mechanism for keeping the crop in contact with a feeder means and providing an even flow to the collecting or processing apparatus, while preventing the crop material from being blown off the pick-up.

Conventionally, retainer screens or windguards comprise a bar extending across the pick-up mechanism with a plurality of tines attached thereto along the length of the bar, the tines extending rearwardly over the pick-up mechanism. Usually the windguard has no fixed position to the pick-up, but it can be moved upwardly by the material which has been picked up from a windrow and is being conveyed over the pick-up. Such movable windguard is disclosed by U. S. Pat. No. 4,411,127, in which the windguard automatically adjusts its position to the amount of the picked up material to prevent plugging of the pick-up when a larger windrow is encountered. On the other hand, when a small windrow is harvested, the windguard will lower and still ensure an adequate engagement of the crop by the pick-up tines and provide protection from the effects of the wind. Such movable windguard may be forced downwardly by gravity as described in U. S. Pat. No. 4,411,127 or by a spring.

It has been experienced that a movable windguard not always succeeds in smoothing out the crop flow and in providing an even flow to the mouth of the harvesting machine. When irregular patches of crop material are picked up, the windguard is thrown upwardly and looses contact with the surface of the crop layer. This hampers the regular flow of the crop material and exposes it to the action of the wind. Moreover, the top portion of the flow is not properly engaged by the pick-up tines. In some cases the tines may be thrown up that vigorously that they contact a part of the harvesting machine which is mounted above the pickup, thereby inducing structural damage to this part and/or the windguard tines.

SUMMARY OF THE INVENTION

It therefore is an object of the present invention to remedy to these problems and to provide an improved windguard structure which is capable of providing an even flow of crop material to the collecting and/or processing apparatus, even when irregular patches are picked up.

According to the invention, an agricultural harvesting machine is provided with a crop intake mechanism for picking up crop material from a field and feeding it to the inlet of a crop collecting and/or processing device; a crop retainer mechanism mounted above the intake apparatus for engaging the upper portion of the crop material while it is being fed to the inlet, the retainer mechanism being movable between a lower position assumed when no crop material is present on the crop intake mechanism and an upper position when a considerable amount of crop material is present on the crop intake mechanism; and a mechanism for damping the motion of the crop retainer mechanism.

The crop retainer mechanism may be of the windguard type, presenting a plurality of parallel tines. Advantageously the dampening mechanism damp the motion thereof in the upward and downward direction.

The dampening mechanism may be of the friction or viscous type, generating a force which is opposite to the direction of movement of the retainer.

In a compact and effective embodiment the viscous damping effect may be obtained from gas springs which are mounted to the pivot of the retainer mechanism. The motion of the windguard may further be limited by adjustable abutment which is mounted for engagement by a lug mounted to the same pivot.

BRIEF DESCRIPTION OF THE DRAWINGS

The advantages of this invention will become apparent upon consideration of the following detailed disclosure of the invention, especially when taken in conjunction with the accompanying drawings, wherein.

DETAILED DESCRIPTION OF THE PREFERRED EMBODIMENT

The terms "front", "rear", "forward", "rearward", "left" and "right" used throughout this description are determined with respect to the normal direction of travel of the machine in operation. However, they are not to be construed as limiting terms.

Figure 1:
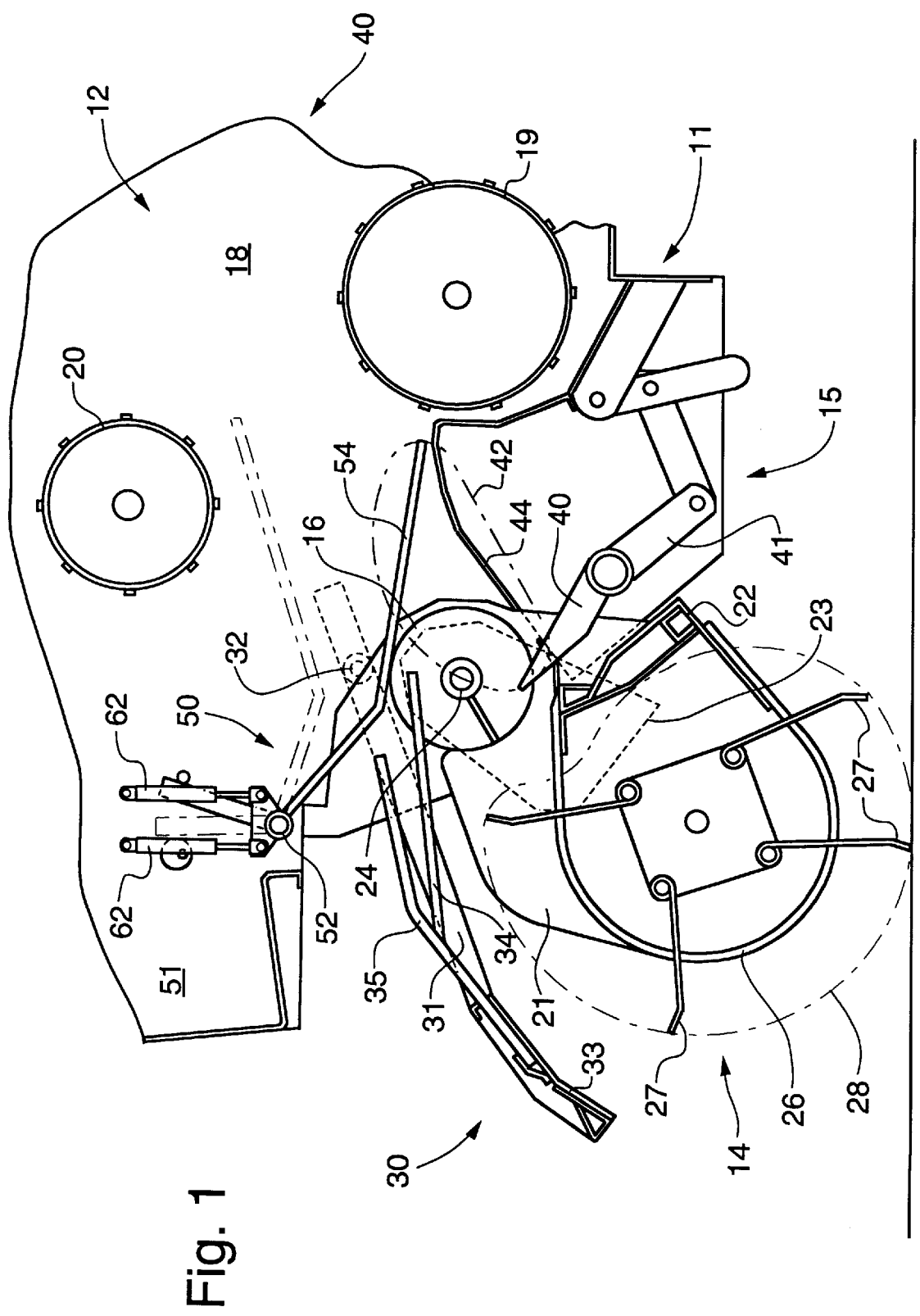
FIG. 1 is sectional view of a pick-up apparatus provided with a pivotable windguard.

Referring now to the drawings for a more detailed description of the invention, FIG. 1 shows a section of a round baler 10, including a main frame 11, a bale forming or baling chamber 12 mounted onto this frame 11 for forming therein a cylindrical package of crop material and a pick-up assembly 14 for picking up crop material, such as hay, straw or silage grass, from a field and delivering it to feeder mechanism 15 which feeds the crop material into the mouth of the baling chamber 12. The width of the pick-up assembly 14 exceeds the width of the baling chamber 12. Crop material from the side portions of the pick-up assembly is urged inwardly within the reach of the feeder mechanism 15 by a pair of stub augers 16 which are rotatably mounted above the rear side portions of the pick-up assembly 14.

The baling chamber 12 is constituted by a pair of parallel side walls 18 (only one shown) and a movable bale forming means which is mounted along the periphery of the chamber 12 for engaging the crop material and rotating it into a cylindrical package. The bale forming means may be constituted by a set of rollers, a set of parallel belts and/or a chains-and-slats assembly. The floor roll 19 and the stripper roll 20 shown in FIG. 1 are mounted between the side walls 18 and are part of the bale forming means. These rolls 19, 20 define the lower and upper limit of the mouth of the baling chamber 12.

The pick-up assembly 14 comprises a pick-up frame 22 including a pair of side plates 21, which are mounted by a pair of support arms 23 (only one shown) to the side of the baler frame 11. For upward and downward movement of the pick-up assembly 14, the support arms 23 are pivoted by appropriate means, such as a hydraulic cylinder (not shown), about a transverse axis 24 coinciding with the axis of the stub augers 16. The assembly 14 further comprises a set of side-by-side arranged guide plates 26 which are affixed to the pick-up frame 22. In a conventional manner four sets of pick-up tines 27 are traveled through the spacings between the guide plates 26 along a path 28, illustrated in phantom in FIG. 1.

A front windguard 30 is arranged above the pick-up assembly 14. It comprises a pair of brackets 31 fastened to the side of the baler frame 11 at location 32. A transverse member or beam 33 extends between the brackets 31 and carries a plurality of parallel, rearwarly projecting tines 34, 35.

Crop material lifted up from the field by the pick-up tines 27 is conveyed by the same between the guide plates 26 and the windguard tines 34, 35 to the stub augers 16 and the feeder mechanism 15.

The feeder mechanism 15 comprises a set of fingers 40 which are moved by a conventional linkage mechanism 41 along a feeder path 42, illustrated in phantom in FIG. 1. The fingers 40 move the crop material along a bottom plate 44 bridging the space between the rear end of the guide plates 26 and the floor roller 19. The plate 44 has parallel slots providing passage for the fingers 40 during operation of the feeder mechanism 15.

The top of the crop material which is conveyed along the bottom plate 44, is engaged by a retainer mechanism in the form of a rear windguard 50 comprising a transverse rod 52 which is journalled in front wall extensions 51 of the side walls 18 of the baling chamber 12. A plurality of parallel retainer tines 54 is rigidly attached to the rod 52 along the length thereof. The retainer tines 54 are arranged between the tines 34, 35 of the front windguard 30. The rear windguard 50 can be pivoted between a lower position shown in solid lines and an upper position shown in phantom lines in FIG. 1.

Figure 2:
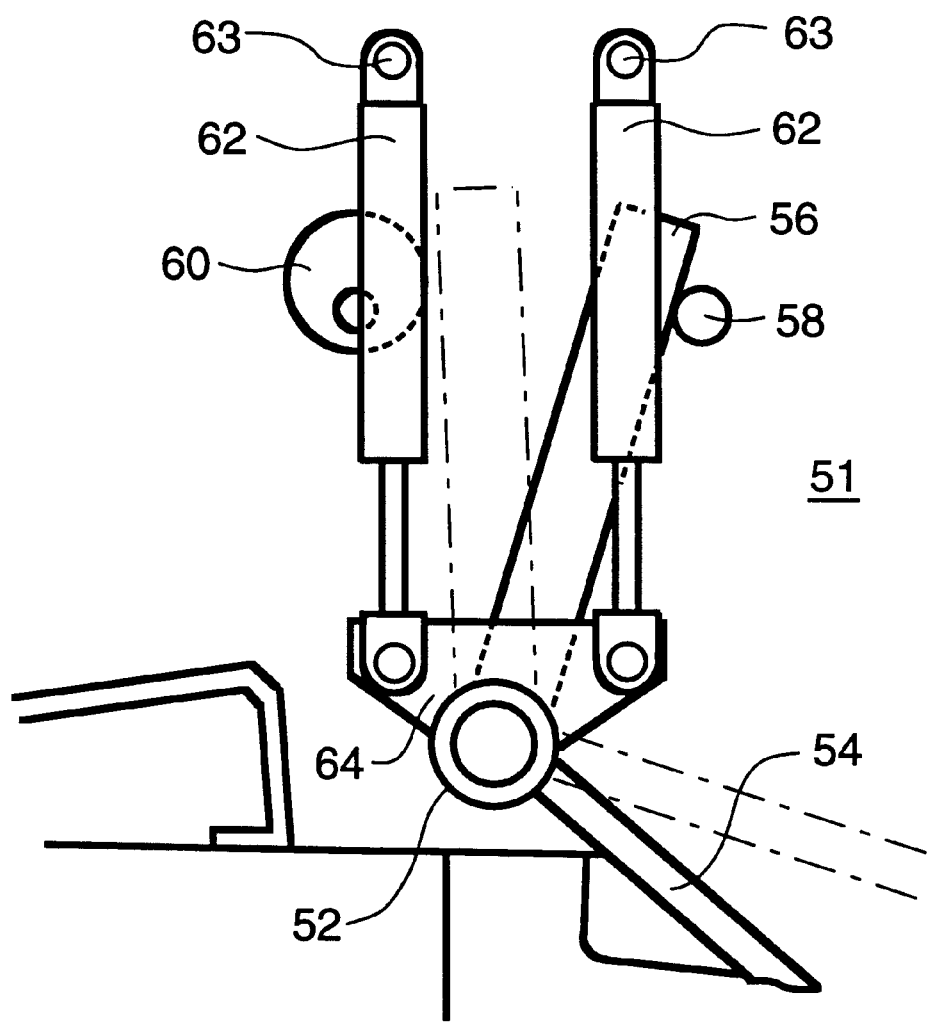
FIG. 2 is an enlarged detail of the mounting of the windguard of FIG. 1, showing a pair of gas springs affixed near its pivot.

The windguard 50 has on one side of the rod 52, adjacent the wall extension 51, a lug 56 which is used for limiting the pivotal movement of this windguard. As shown in FIG. 2, the lower windguard position is defined by the position of an circular abutment 58 which is bolted onto the inside of the wall extension 51. When the baler 10 is running empty, the lug 56 rests against the abutment 58 and the tips of the retainer tines 54 float above the bottom plate 44. The upper windguard position is defined by another circular abutment 60 for the lug 56. This abutment 60 is bolted onto the wall extension 51 on the other side of the lug. For easy adjustment of this upper position, the bolt is mounted through an eccentric hole in the abutment 60. The most forward position of the lug 56 can be adapted by rotating the abutment 60 about the eccentric hole and refastening the same.

The movable rear windguard 50 easily adapts to the variable thickness of the crop layer which is conveyed along the bottom plate 44. However means have to be provided to ensure that retainer tines 54 are not randomly thrown upwardly thereby loosing contact with the layer. This is accomplished by a pair of gas springs 62 which damp the motion of the tines 54. One end of the gas springs 62 is attached by a bolt 63 to the wall extension 51. The other end is attached to a tip of a generally triangular lever member 64 which is welded to the rod 52, adjacent the lug 56. The two gas springs 62 are compressed partially, but as they are disposed symmetrically on opposite sides of the rod 52, their forces are balanced such that they do not counteract the effect of the gravity on the rear windguard 50. Hence the gas springs 62 do not prevent the windguard from assuming its lower rest position when no crop material is introduced. Such stable rest position is essential for not obstructing the proper operation of devices in the windguard area, such as a twine wrapping mechanism which is used for completion of the bale before it is deposited on the field.

When the rear windguard 50 is pivoted, e.g. by incoming crop material, one gas spring 62 will expand while the other is compressed. The maximum displacement is about 16 mm. The force applied by the compressed gas spring 62 increases slightly, but the effect on the torque applied to the windguard 50 is compensated by the shortening of the load arm during rotation of the lever member 64. Hence, there will be no substantial increase or decrease of the moment applied to the end of the rod 52. The gravity will still play its part and there is no effect of the gas springs on the equilibrium position of the windguard 50. However there is a substantial retarding effect caused by the throttling of the gas during its passage through the orifices in the plunger inside the gas spring 62. The motion of the rod which is affixed to the plunger is damped during its movement relative to the body of the gas spring 62. Consequently, the use of the counteracting gas springs has a damping effect on the pivotal motion of the retainer tines 54.

A lump of crop material which is suddenly taken in by the baler 10 pushes the rear windguard 50 upwardly, but the gas springs 62 allow only a slow raising of the retainer tines 54, such that the lump is spread out for engagement by the feeder fingers 40. Sudden movement of the windguard 50 is precluded and it assumes an equilibrium position corresponding to the mean volume of the harvested windrow.

It will be appreciated that thus is provided a retainer mechanism which is better capable of providing a regular and steady flow of crop material to the harvesting machine.

Although the present invention has been described with reference to a round baler, it will be obvious to the skilled person that it equally can be used in other harvesting equipment having a pick-up device for picking up crop material from a field, such as rectangular balers, loader wagons, combine or forage harvesters. It is also conceivable to use other dampening mechanism for controlling the movement of the retainer tines 54, e.g. a double-acting shock absorber. The damping effect may also be acquired from a single gas spring 62 or from a pair of counter-acting gas springs which are mounted on opposite sides of a single lever arm affixed to the windguard rod 52. The feeder mechanism 15 may also be replaced with another conveyor means, e.g. a rotary conveyor.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

Having thus described the invention, what is claimed is:

1. In an agricultural harvesting machine having a crop intake apparatus for picking up crop material from a field and feeding it to the inlet of a crop collecting and/or processing device and a crop retainer mechanism mounted above said intake apparatus for engaging the upper portion of said crop material whilst it is being fed to said inlet, said retainer mechanism being moveable between a lower position assumed when no crop is present on said crop intake apparatus and an upper position when a considerable amount of crop material is present on said crop intake apparatus, the improvement comprising:

a dampening mechanism for dampening the motion of the said crop retainer mechanism, the retainer mechanism includes a plurality of parallel, longitudinally arranged tines, the parallel tines are affixed to a transverse support member which is mounted for pivotal movement about a substantially horizontal axis, wherein said dampening mechanism are operable to damp the motion of said retainer mechanism in the upward and the downward direction.

2. The agricultural harvesting machine of claim 1 wherein said dampening mechanism is of the friction type.

3. The agricultural harvesting machine of claim 1 wherein said dampening mechanism is a shock absorber.

4. The agricultural harvesting machine of claim 1 wherein said dampening mechanism includes at least one gas spring.

5. The agricultural harvesting machine of claim 4 wherein said dampening mechanism comprises a pair of mutually counteracting gas springs.

6. The agricultural harvesting machine of claim 4 wherein said dampening mechanism is mounted to a lever member affixed to said support member.

7. The agricultural harvesting machine of claim 1 further comprising adjustable abutment device defining a topmost position of said retainer mechanism.

8. The agricultural harvesting machine of claim 7 wherein said abutment device includes a circular element mounted for rotation about an eccentric axis.

9. The agricultural harvesting machine of claim 7 wherein said retainer mechanism is preceded by a second retainer mechanism having a front end extending above and in front of said crop intake apparatus.

10. The agricultural harvesting machine of claim 9 wherein said second retainer mechanism comprises a front windguard having tines with ends extending between the tines of the retainer mechanism.

* * * * *